(12) United States Patent
Schaaf et al.

(10) Patent No.: US 12,485,560 B2
(45) Date of Patent: Dec. 2, 2025

(54) SAFETY COUPLING AND HANDLING SYSTEM COMPRISING A SAFETY COUPLING

(71) Applicant: J.Schmalz GmbH, Glatten (DE)

(72) Inventors: Walter Schaaf, Freudenstadt-Grüntal (DE); Matthias Frey, Sulz-Dürrenmettstetten (DE)

(73) Assignee: J. Schmalz GmbH, Glatten (DE)

( * ) Notice: Subject to any disclaimer, the term of this patent is extended or adjusted under 35 U.S.C. 154(b) by 48 days.

(21) Appl. No.: 18/425,052

(22) Filed: Jan. 29, 2024

(65) Prior Publication Data

US 2024/0253255 A1 Aug. 1, 2024

(30) Foreign Application Priority Data

Jan. 30, 2023 (DE) ...................... 10 2023 102 168.0

(51) Int. Cl.
*B25J 19/06* (2006.01)
*B25J 15/00* (2006.01)
*B25J 19/00* (2006.01)

(52) U.S. Cl.
CPC ......... *B25J 19/063* (2013.01); *B25J 15/0019* (2013.01); *B25J 19/0004* (2013.01)

(58) Field of Classification Search
CPC .... B25J 15/0019; B25J 19/0004; B25J 19/06; B25J 19/063
See application file for complete search history.

(56) References Cited

FOREIGN PATENT DOCUMENTS

| DE | 10 2016 101 173 A1 | 7/2017 | | |
|---|---|---|---|---|
| DE | 10 2019 208 808 A1 | 12/2020 | | |
| DE | 10 2020 103 416 A1 | 8/2021 | | |
| JP | 2010 076056 A | 4/2010 | | |
| JP | 2017047005 A | * | 3/2017 | |
| WO | WO-2014205475 A1 | * | 12/2014 | ............ B25J 9/1638 |

* cited by examiner

*Primary Examiner* — William C Joyce
(74) *Attorney, Agent, or Firm* — ASLAN LAW, P.C.

(57) ABSTRACT

A safety coupling for connecting an end effector to a manipulator, comprising a manipulator coupling portion for connecting the safety coupling to the manipulator, an end effector coupling portion for connecting the safety coupling to the end effector, a lowering device, which connects the manipulator coupling portion and the end effector coupling portion to one another in a way that the end effector coupling portion and an end effector optionally coupled to the end effector coupling portion can descend relative to the manipulator coupling portion, with control, in particular with automatic braking, as a result of gravity, and a securing device, which can assume a normal configuration and an emergency configuration, the securing device blocking the lowering device when the securing device is in the normal configuration and releasing the lowering device when the securing device is in the emergency configuration.

9 Claims, 3 Drawing Sheets

SAFETY COUPLING AND HANDLING SYSTEM COMPRISING A SAFETY COUPLING

CROSS-REFERENCE TO RELATED APPLICATIONS

This application claims priority to DE Patent Application No. 10 2023 102 168.0 filed on Jan. 30, 2023, the entire contents of which are hereby incorporated by reference.

SUMMARY OF INVENTION

The invention relates to a safety coupling for connecting an end effector to a manipulator. The invention also relates to a handling system comprising a manipulator, an end effector, and such a safety coupling.

Handling systems having a manipulator and an end effector are used in a variety of application areas, for example in order to transfer objects from a storage container into a transport container or to hold a workpiece during processing. The manipulator can be, for example, a robot or a gantry crane. The end effector can be, for example, a mechanical gripper or a suction gripping device for suctioning an object.

As automation progresses, it is of increasing interest to operate handling systems in a common or overlapping working area with a human and, if necessary, also to enable interactions between human and handling system (so-called human-robot collaboration, HRC for short). For such collaborative operation in the presence of a person, it is of decisive importance that the handling system does not pose any risk to the person, in particular in emergency situations in which a normal process sequence is disrupted (for example in the event of a power failure or a defect of the handling system). A known option for this purpose is, for example, equipping the manipulator with an emergency stop function so that, in the event of a power failure, the manipulator stops or moves into a safety configuration.

Furthermore, there is a risk that, in an emergency situation (for example in the event of a power failure), a gripping effect of the end effector is impaired or even completely fails, which in the worst case can lead to the detachment of a gripped object and to the falling of said object.

Proceeding therefrom, the invention is concerned with the object of configuring a handling system of the type mentioned at the outset for safe operation, using simple design.

This object is achieved by a safety coupling having the features of the claimed invention. The safety coupling is designed to connect, in particular releasably connect, an end effector to a manipulator. The end effector can be, for example, a vacuum gripping device, in particular a suction gripper. The manipulator can be, for example, a robot, an industrial robot, a lightweight robot, an HRC robot, a gantry crane, or the like.

The safety coupling comprises a manipulator coupling portion for connecting the safety coupling to the manipulator. In this respect, the manipulator coupling portion is designed in particular to couple, preferably repeatably releasably couple, the safety coupling to the manipulator. For example, the manipulator coupling portion can have a flange portion that can be connected, in particular repeatably releasably connected, to a connection flange of the manipulator, for example to a robot flange of a robot. It is conceivable, for example, for the manipulator coupling portion to be connectable to the manipulator by means of a screw connection or a bayonet connection.

The safety coupling also comprises an end effector coupling portion for connecting the safety coupling to the end effector. In this respect, the end effector coupling portion is designed in particular to couple, preferably repeatably releasably couple, an end effector to the safety coupling. It is conceivable, for example, for the end effector coupling portion to be connectable to the end effector by means of a screw connection or a bayonet connection. It is also conceivable for the end effector coupling portion to be in the form of a quick coupling that enables, in particular, tool-free connection of the end effector and the end effector coupling portion. The manipulator coupling portion and the end effector coupling portion are preferably arranged on mutually opposite sides of the safety coupling.

The safety coupling also comprises a lowering device that connects the manipulator coupling portion and the end effector coupling portion to one another. The lowering device extends in particular along a lowering axis which, when the safety coupling is coupled to the manipulator, is oriented in particular vertically, i.e. in the direction in which gravity acts. The lowering device is designed to let the end effector coupling portion and an end effector optionally coupled thereto and, in particular, an object optionally held on the end effector descend relative to the manipulator coupling portion with control, preferably with braking, i.e. at reduced speed, as a result of gravity, in particular until the end effector or the object is deposited on a support, for example a floor. In this respect, the lowering device is in particular designed in such a way that it can be lengthened, with control, under the action of force, in particular by the end effector and an object held on the end effector, so that a distance between the end effector coupling portion and the manipulator coupling portion is increased.

The safety coupling also comprises a securing device, which can assume a normal configuration and an emergency configuration. In the normal configuration, the securing device blocks the lowering device. In the emergency configuration, the securing device releases the lowering device. In this respect, the securing device is designed in particular in such a way that, and interacts with the lowering device in such a way that, the lowering device is blocked by the securing device when the securing device is in the normal configuration and is released by the securing device when the securing device is in the emergency configuration. In other words, the securing device is designed in such a way that, in the normal configuration, descending of the end effector coupling portion relative to the manipulator coupling portion is blocked, i.e. is not possible, and, in the emergency configuration, descending of the end effector coupling portion relative to the manipulator coupling portion is possible. In the normal configuration, stable retention of the end effector on the manipulator is thus enabled, so that the end effector can, for example, be moved automatedly by the manipulator on defined movement paths. In the emergency configuration, the lowering device then makes it possible for the end effector coupling portion and, in particular, an end effector optionally arranged on the end effector coupling portion and an object possibly held on the end effector to descend with control, in particular at slow speed, in particular until they have reached a stable configuration on a support.

Such a safety coupling makes it possible, during normal operation (securing device in normal configuration), to securely fasten an end effector and an object optionally held on the end effector to a manipulator and, in an emergency situation (securing device in emergency configuration), to transfer the end effector and the object, with control, into a stable configuration. In this way, a safety function is provided, in particular without external safety measures (e.g. protective fences around a handling system or an uninterruptible power supply) additionally being absolutely necessary. Furthermore, since the safety coupling can be arranged modularly between the manipulator and the end effector, only a comparatively small installation space is required, which is advantageous in particular for collaborative operation of a handling system with an operator.

It is particularly preferred if the securing device is designed in such a way that, in particular has a triggering mechanism in such a way that, the securing device switches independently, i.e. automatically, from the normal configuration into the emergency configuration when a predefined triggering condition occurs. The triggering condition is in particular the occurrence of an emergency situation in which a normal process sequence is disrupted. Such an embodiment makes it possible to release the lowering device with quick response and, in particular, without the involvement of an operator, and thus to enable a controlled, slow lowering of the end effector and of an object optionally arranged on the end effector. In this way, a securing mechanism is created that reduces the risk of uncontrolled falling of a gripped object and an associated risk of injury to an operator.

The triggering condition can be an interruption, in particular a failure, of an electrical power supply to the safety coupling. The triggering condition can also be an interruption, in particular a failure, of an optional compressed-air supply to the safety coupling. The triggering condition can also be an interruption, in particular a failure, of an optional negative-pressure supply to the safety coupling, for example as a result of a defect or a power failure at a negative-pressure supply device. The triggering condition can also be the undershooting or exceeding of a threshold value of a leakage in an end effector connected to the safety coupling. The triggering condition can also be the undershooting or exceeding of a threshold value of a negative pressure applied to the safety coupling or to an end effector connected to the safety coupling.

It is also conceivable for the securing device to be designed in such a way that it can be transferred from the normal configuration into the emergency configuration by the actuation of an emergency switch by an operator. For example, it is conceivable that the securing device is connected, by means a wired or wireless data connection, to an emergency switch or a control device and, by means thereof, can be manually transferred from the normal configuration into the emergency configuration.

It is also conceivable for the safety coupling to comprise a receiving device for receiving an emergency signal. The triggering condition can then also be the receiving of an emergency signal by the receiving device of the safety coupling. The receiving device can be integrated in the safety coupling itself. The receiving device can also be provided externally, for example as part of a handling system comprising the safety coupling. The receiving device can be, for example, a radio antenna. Such an embodiment makes it possible, for example, for an operator to trigger the lowering of the gripper with the load by radio.

As explained in detail below, the safety coupling can be designed differently depending on the triggering condition.

In an advantageous embodiment, the lowering device can comprise a length-adjustable, in particular extendable and retractable, connection device, by means of which the manipulator coupling portion and the end effector coupling portion are connected. The connection device is in particular designed in such a way that a distance between the manipulator coupling portion and the end effector coupling portion along a lowering axis can be changed.

The connection device can comprise a cable connection. In particular, the cable connection can comprise a mechanically or fluidically braked cable pulley and/or a frictionally braked cable. For example, it is conceivable that the cable pulley is connected to the manipulator coupling portion and the end effector coupling portion is connected to the cable, in particular to a cable end. Such an embodiment enables a particularly compact and cost-effective design of the connection device.

Alternatively or additionally, the connection device can comprise a telescopic rod that is connected, at one end, to the manipulator coupling portion and, at the other end, to the end effector coupling portion. The telescopic rod can in particular be mechanically or fluidically braked and can thus enable controlled lowering of the end effector coupling portion relative to the manipulator coupling portion. An embodiment with a telescopic rod makes it possible to transmit transverse forces between the end effector coupling portion and the manipulator coupling portion even when the connection device is in an extended or partially extended configuration. In this way, uncontrolled swinging of the end effector and of the object during lowering can be prevented.

Alternatively or additionally, the connection device can comprise a damped spring, in particular a coil spring. In particular, the spring can be connected, at one end, to the manipulator coupling portion and, at the other end, to the end effector coupling portion.

Alternatively or additionally, the connection device can have a lifting tube to which negative pressure can be applied. In particular, the lifting tube can be connected, at one end, to the manipulator coupling portion and, at the other end, to the end effector coupling portion. The lifting tube can, for example, be designed in such a way that, in the emergency configuration, the lifting tube can be supplied with air via a throttle valve and can thus be lengthened with control. In this respect, the securing device can be designed to control the throttle valve.

Alternatively or additionally, the connection device can have a fluidically braked, in particular air-braked, piston. For example, the piston can be movable in a cylinder with displacement of fluid, in particular air, from the cylinder. A braking effect can then be provided, for example, in that the fluid escapes from the cylinder through a throttle. The throttle can in particular be designed in such a way that a flow resistance is adjustable, in particular settable. This makes it possible to variably set a braking effect, for example according to the weight of the end effector and/or of an object held on the end effector.

In an advantageous embodiment, the securing device can be designed in such a way that, in the normal configuration, it fixes the manipulator coupling portion and the end effector coupling portion at a fixed distance from one another. Then, in the normal configuration, the lowering device can be blocked by virtue of the fact that the manipulator coupling portion and the end effector coupling portion are held together by the securing device. Such a design has the additional advantage that an end effector held on the end effector coupling portion and an object optionally held on the end effector can be fastened to the manipulator securely and in a defined position, so that the end effector can be precisely and repeatably moved by the manipulator. The securing device can in particular be designed to fix, in the normal configuration, the manipulator coupling portion and the end effector coupling portion mechanically, in particular with form closure and/or with force closure, magnetically and/or by means of negative pressure.

For example, the securing device can comprise an actuatable permanent magnet or an electromagnet, by means of which the manipulator coupling portion and the end effector coupling portion can be fixed at a fixed distance from one another. In particular, the securing device can be designed in such a way that, when the permanent magnet or the electromagnet is actuated, the securing device connects the manipulator coupling portion and the end effector coupling portion to one another (normal configuration of the securing device) and, when the actuation is eliminated (for example as a result of an interruption of the electrical power supply), this connection is released. For example, it is conceivable for the securing device to have one or more connection arms, which connection arm is pivotably retained on the manipulator coupling portion or on the end effector coupling portion and on the free end of which connection arm an actuatable permanent magnet or an electromagnet is provided. An embodiment of the securing device with an actuatable permanent magnet or electromagnet is advantageous in particular for addressing an interruption, in particular a failure, of an electrical power supply, since, in the event of a failure of the power supply, a magnetic effect automatically diminishes. In this respect, the permanent magnet or the electromagnet forms both a triggering mechanism and a fixing device of the securing device. Therefore no additional control mechanisms, for example sensors or switches, are required, enabling a compact and cost-effective design of the safety coupling. However, it is also conceivable, for example, that the triggering condition is an interruption of a compressed-air supply or negative-pressure supply and, consequently, a separate triggering mechanism interrupts a supply of current to the permanent magnet or the electromagnet.

The securing device can also comprise one or more actuating elements, which can be transferred, in particular moved, between a first switching position and a second switching position. The at least one actuating element can be designed in such a way that, in the normal configuration of the securing device, said actuating element is in the first switching position (normal configuration of the actuating element) and, when the triggering condition occurs, said actuating element is automatically transferred into the second switching position (emergency configuration of the actuating element).

As explained in detail below, the at least one actuating element can form a triggering mechanism for actuating a fixing device that selectively either blocks or releases the lowering device. However, it is also conceivable for the first actuating element itself to form a fixing device for blocking the lowering device.

In an advantageous development, the at least one actuating element can comprise a wire or bar made of a shape memory material. Such wires made of shape memory materials have the property of very rapidly contracting from a pre-stretched state to an original starting shape under the influence of heat. The heat required for this can be provided in particular by a heating effect as the shape memory wire is supplied with current. In the present context, the shape memory wire can, in this respect, be designed in particular in such a way that it contracts automatically when the triggering conditions occur. Specifically, it is conceivable, for example, that the shape memory wire has, in a normal configuration, a stretched configuration (normal configuration of the actuating element) and, when the triggering condition occurs, is supplied with current in such a way that it is automatically transferred into an unstretched starting configuration (emergency configuration of the actuating element). The change in length of the shape memory wire occurring in this case can then serve, for example, as a triggering mechanism for actuating a fixing device, which selectively either blocks or releases the lowering device. The wire or bar can in this respect be a mechanical triggering mechanism. In order to be able to supply current to the shape memory wire particularly quickly in the case of an emergency, it can be advantageous if an energy store, preferably comprising a capacitor, is provided.

It is also conceivable for the actuating element to be an actuatable, in particular pneumatically actuatable, actuation piston that can be moved between a first and a second switching position. In particular, the actuation piston is loaded, preferably spring-preloaded, toward the second switching position. For example, the actuating element can be a pneumatic cylinder. Such a pneumatic cylinder can be implemented with simple design and is robust in function, which is advantageous for the intended safety applications.

In particular, the actuation piston can be designed in such a way that, when it is actuated, in particular when compressed air is applied to it, against the loading or spring preload, it is in the first switching position (normal configuration) and, in the event of an interruption, in particular in the event of failure, elimination, of the actuation, in particular in the event of interruption, in particular elimination, of a compressed-air supply (triggering condition), the actuation piston is automatically transferred by the spring preload into the second switching position (emergency configuration). Such an embodiment with a pneumatically actuatable actuation piston is advantageous in particular for addressing an interruption of a compressed-air supply to the safety coupling and/or an interruption of a negative-pressure supply to the safety coupling, since, in the event of failure of the compressed-air supply, the cylinder is automatically transferred into the emergency configuration (second switching position) and thus the lowering mechanism is automatically released. Therefore no additional control mechanisms, for example sensors or switches, are required, enabling a compact and cost-effective design of the safety coupling. It is also conceivable for the safety coupling to comprise a valve device which, in the event of failure of an electrical power supply, disconnects the actuation pin from a compressed-air supply, i.e. interrupts an actuation of the actuation piston.

As mentioned above, it is conceivable for the actuating element to form a triggering mechanism of the securing device and, at the same time, a fixing device for connecting the manipulator coupling portion and the end effector coupling portion. For example, it is conceivable that, in the first switching position (normal configuration), the actuation piston interacts with the manipulator coupling portion and the end effector coupling portion in such a way that the manipulator coupling portion and the end effector coupling portion are fixed at a fixed distance from one another. It is conceivable, for example, that in the first switching position, the actuation piston or a cylinder pin of the actuation piston engages in corresponding connection holes in the manipulator coupling portion and in the end effector coupling portion and thus connects the coupling portions. In the second switching position, the actuation piston can then be outside of the connection holes, the actuation piston having been pulled out of said connection holes.

It is also possible for the actuating element to form only the triggering mechanism for activating an additional fixing device. For example, the securing device can comprise a fixing device that can assume a locking configuration and a release configuration, in which case the fixing device fixes the manipulator coupling portion and the end effector coupling portion at a fixed distance from one another when the fixing device is in the locking configuration (normal configuration of the securing device) and such fixing is released when the fixing device is in the release configuration (emergency configuration of the securing device). The fixing device can then interact with the actuating element in such a way, in particular can be actuatable by the actuating element, for example the actuation piston described above or the shape memory wire, in such a way that, by transfer of the actuating element from the first switching position into the second switching position, the fixing device is transferred from the locking configuration into the release configuration. In this respect, the fixing device and the actuating element can interact with one another in such a way that, when the actuating element is in the first switching position, the fixing device is in the locking configuration and, when the actuating element is in the second switching position, the fixing device is in the release configuration.

For example, it is conceivable for the fixing device to comprise a pin which, in the locking configuration, engages in corresponding connection holes in the manipulator coupling portion and in the end effector coupling portion and, in the release configuration, is outside of the connection holes, having been pulled out of said connection holes.

It is also conceivable for the fixing device to comprise two toothed rings, which can be rotated relative to one another in such a way that they can assume a locking configuration (normal configuration) and a release configuration (emergency configuration). In particular, the toothed rings can be designed in such a way that, in the locking configuration, the toothed rings connect the manipulator coupling portion and the end effector coupling portion to one another (and thus block the lowering device) and, in the release configuration, the toothed rings are displaceable relative to one another in such a way that the manipulator coupling portion and the end effector coupling portion can be moved relative to one another (and thus the lowering device is released, i.e. lowering of the end effector coupling portion relative to the manipulator coupling portion is possible).

Within the scope of a general aspect, the safety coupling can comprise a housing. In particular, the housing can be of a two-part or multi-part design, with a first housing portion, which is connected to the manipulator coupling portion, and a second housing portion, which is connected to the end effector coupling portion. The housing portions can preferably be designed in such a way that they enclose the lowering device, in particular the connection device, when it is in its retracted configuration (normal configuration) and become separated from one another as the lowering device, in particular the connection device, extends (emergency configuration).

The object stated at the outset is also achieved by a handling system according to the claimed invention. The handling system is designed in particular for gripping and handling objects. The handling system comprises a manipulator, in particular a robot, and an end effector, in particular a vacuum gripping device, preferably a suction gripping device. The handling system also comprises a safety coupling described above. The end effector is fastened to the manipulator by means of the safety coupling. In particular, the safety coupling is fastened to the manipulator by means of the manipulator coupling portion, and the end effector is fastened to the safety coupling by means of the end effector coupling portion. The advantages and optional features of the safety coupling, of the manipulator and of the end effector, as explained above with respect to the safety coupling as such, can also be used to design the handling system according to the claimed invention, so that reference is made to the above disclosure in order to avoid repetitions.

The invention is explained in more detail below with reference to the figures.

DETAILED DESCRIPTION

In the following description and in the figures, identical reference signs are in each case used for identical or corresponding features.

Figure 1:
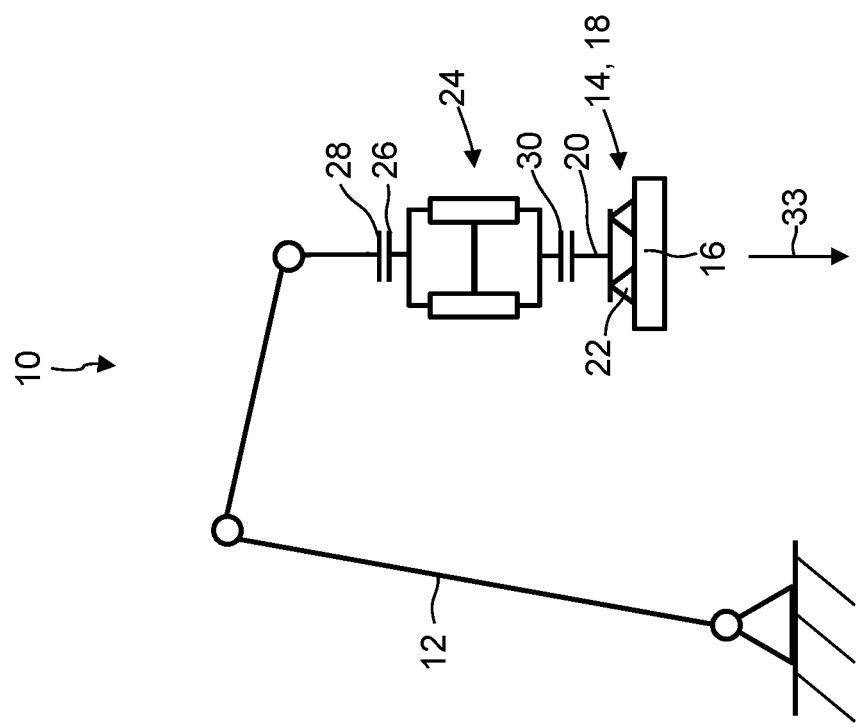
FIG. 1 is a simplified schematic representation of a handling system.

FIG. 1 shows a handling system, which is denoted as a whole by reference sign 10. The handling system 10 comprises a manipulator 12 and an end effector 14 for gripping an object 16. The manipulator 12 can be, for example, a robot, in particular an industrial robot or a lightweight robot.

In the example shown, the end effector 14 is in the form of a suction gripping device 18. As shown schematically in FIG. 1, the suction gripping device 18 comprises, by way of example, a support frame 20 on which one or more, in the example shown two, suction bodies 22 for suctioning the object 16 are arranged.

In embodiments not shown, the end effector 14 can also be in the form of a mechanical gripper or a magnetic gripper, for example.

The handling system 10 also comprises a safety coupling 24, by means of which the end effector 14 is fastened, in particular releasably fastened, to the manipulator 12. As shown in FIG. 1, the safety coupling 24 is arranged between the manipulator 12 and the end effector 14.

The safety coupling 24 comprises a manipulator coupling portion 26 for coupling the safety coupling 24 to the manipulator 12. For example, the manipulator coupling portion 26 can be screwed to a connection flange 28 of the manipulator 12 or connected by means of a bayonet connection.

The safety coupling 24 also comprises an end effector coupling portion 30 opposite from the manipulator coupling portion 26, for coupling the end effector 14 to the safety coupling 24 and thus to the manipulator 12. The end effector coupling portion 30 can comprise, for example, a quick-change coupling for releasably coupling the end effector 14.

The safety coupling 24 also comprises a lowering device 32 (see FIG. 3), which is designed to let the end effector coupling portion 30, the end effector 14 coupled to the end effect coupling portion, and an object 16 optionally held on the end effector 14 descend relative to the manipulator coupling portion 26 with control, in particular at reduced speed, as a result of gravity. The direction in which gravity acts is shown with the arrow 33 in the figures.

Figure 3:
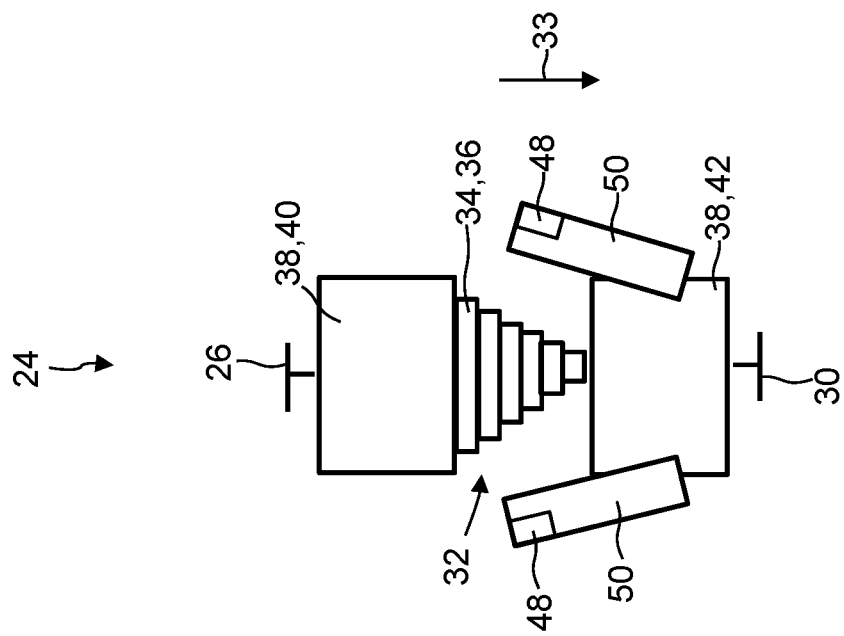
FIG. 3 is a simplified schematic representation of a safety coupling in emergency configuration.

The lowering device 32 comprises a length-adjustable connection device 34, by means of which the manipulator coupling portion 26 and the end effector coupling portion 30 are connected to one another (see FIG. 3).

In the example shown, the connection device 34 comprises a telescopic rod 36, which is connected, at one end, to the manipulator coupling portion 26 and, at the other end, to the end effector coupling portion 30.

The telescopic rod 36 is preferably mechanically or fluidically braked, so that the end effector coupling portion 30 (together with an end effector 14 arranged on the end effector coupling portion and an object 16 held in turn on the end effector) can descend with control in the direction of gravity (see arrow 33).

Figure 2:
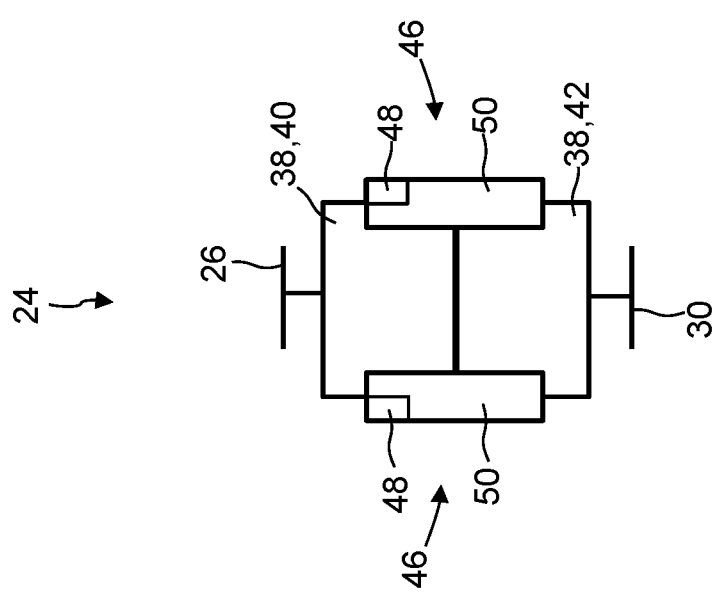
FIG. 2 is a simplified schematic representation of a safety coupling in normal configuration.

FIG. 2 shows the safety coupling 24 with the lowering device 32 retracted. FIG. 3 shows the safety coupling 24 with the lowering device 32 extended.

As shown by way of example in FIGS. 2 and 3, the safety coupling 24 can comprise a two-part or multi-part housing 38, with a first housing portion 40, which is connected to the manipulator coupling portion 26, and a second housing portion 42, which is connected to the end effector coupling portion 30. The housing portions 40, 42 are preferably designed in such a way that they enclose the lowering device 32 when the lowering device is in the retracted configuration (see FIG. 2). The lowering device 32 is then protected from environmental influences by the housing 38. As the lowering device 32 extends, the housing portions 40, 42 then become separated from one another (see FIG. 3).

Figure 4C:
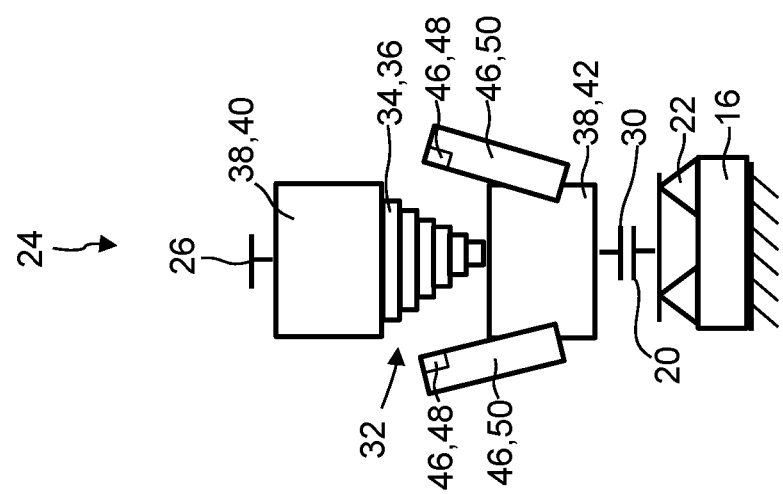
FIG. 4*a-c* are simplified schematic representations of the safety coupling with end effector coupled thereto, in different operating states, for explaining the functioning of the safety coupling.

As explained above, the lowering device 32 is provided to allow, in an emergency situation in which a process sequence of the handling system 10 is disrupted (for example as a result of a failure of the electrical power supply), the end effector 14 and an object 16 held on the end effector to descend with control into a stable configuration on a support, for example onto a building floor 44 (see FIG. 4c). In normal operation of the handling system 10, however, the lowering device 32 should be blocked, so that the end effector coupling portion 30 and the manipulator coupling portion 26 are fixed relative to one another.

Figure 4B:
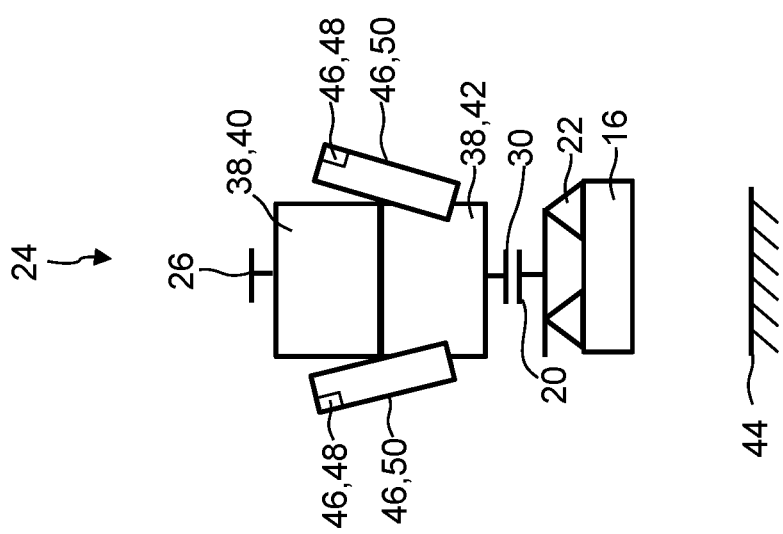
Figure 4A:
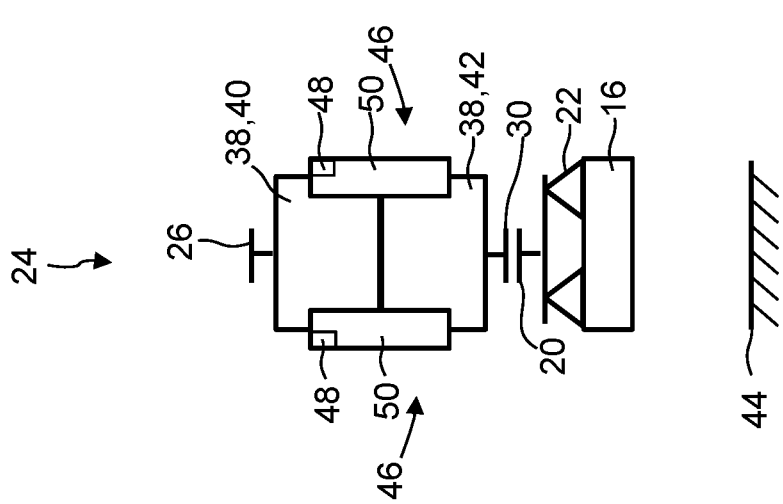

For this purpose, the safety coupling 24 comprises a securing device 46 (only schematically shown in the figures), which can assume a normal configuration shown in FIGS. 2 and 4a and an emergency configuration shown in FIGS. 3, 4b, and 4c.

In the normal configuration, the securing device 46 is configured in such a way that it fixes the end effector coupling portion 30 and the manipulator coupling portion 26 at a fixed distance from one another in such a way that the lowering device 32 is blocked, i.e. extension of the telescopic rod 36 is not possible (see FIG. 2). In the emergency configuration, in contrast, the securing device 46 is configured in such a way that fixing of the end effector coupling portion 30 and of the manipulator coupling portion 26 by the securing device 46 is released, so that the lowering device 32 is released (see FIG. 3).

The securing device 46 is preferably designed in such a way that, when a predefined triggering condition occurs, the securing device independently switches from the normal configuration (see FIG. 2) into the emergency configuration (see FIG. 3). The triggering conditions can be, for example, an interruption of an electrical power supply to the safety coupling 24, an interruption of a compressed-air supply to the safety coupling 34, an interruption of a negative-pressure supply to the safety coupling 24, an exceeding of a threshold value of a leakage in the end effector 14, an undershooting or exceeding of a threshold value of a negative pressure applied to the safety coupling 24, or the receiving of an emergency signal by an optional receiving device (not shown) of the safety coupling 24.

As explained above, different embodiments of the securing device 46 are possible. In the figures, an embodiment of the securing device 46 with electromagnets 48 is shown by way of example. As explained in detail below, the electromagnets 48 are designed to connect the manipulator coupling portion 26 and the end effector coupling portion 30 to one another by magnetic force when the electromagnets are actuated (normal configuration of the securing device 46) and to allow movement of the end effector coupling portion 30 relative to the manipulator coupling portion 26 when the actuation is eliminated (e.g. as a result of an interruption of the electrical power supply to the electromagnets 48).

In the specific example, the securing device 46 comprises two connection arms 50, which are each pivotably retained on the second housing portion 42 connected to the end effector coupling portion 30 and at the free end of each of which an electromagnet 48 is provided. When the electromagnets 48 are in the actuated state (see FIGS. 2 and 4a), the first housing portion 40 and the second housing portion 42 are connected to one another by the magnetic retaining force of the electromagnets 48. In the event of an interruption of the electrical power supply to the electromagnets 48 (for example as a result of a power failure) and the associated elimination of the magnetic retaining force, fixing of the end effector coupling portion 30 and the manipulator coupling portion 26 is released (see FIG. 4b). In particular, the connection arms 50 can fold away from their contact on the first housing portion 40 (see FIG. 4b). As a result, the lowering device 32 is released and the end effector 14 can descend together with the object 16 as a result of gravity, in particular until the object 16 has reached a safe position on the floor 44. In this way, an automatic securing mechanism is created, which makes it possible to transfer an object 16 held on the end effector 14 into a stable configuration in the event of a failure of an electrical power supply.

The invention claimed is:

1. A safety coupling for connecting an end effector to a manipulator, the safety coupling comprising:
   a manipulator coupling portion for connecting the safety coupling to the manipulator;
   an end effector coupling portion for connecting the safety coupling to the end effector;
   a lowering device, which connects the manipulator coupling portion and the end effector coupling portion to one another in such a way that the end effector coupling portion and an end effector optionally coupled to the end effector coupling portion capable of descending relative to the manipulator coupling portion, with control, with automatic braking, as a result of gravity; and
   a securing device, having a normal configuration mode and an emergency configuration mode, the securing device blocking the lowering device when the securing device is in the normal configuration mode and releasing the lowering device when the securing device is in the emergency configuration mode, wherein
   the lowering device comprises a length-adjustable connection device, which connects the manipulator coupling portion and the end effector coupling portion to one another, and
   the connection device comprises one or more of the following devices;
   a. cable connection, which comprises a mechanically or fluidically braked cable pulley and/or a frictionally braked cable;

b. a mechanically or fluidically braked telescopic rod, which is connected, at one end, to the manipulator coupling portion and, at the other end, to the end effector coupling portion;

c. a damped spring, which is connected, at one end, to the manipulator coupling portion and, at the other end, to the end effector coupling portion;

d. a lifting tube, to which negative pressure can be applied and which is connected, at one end, to the manipulator coupling portion and, at the other end, to the end effector coupling portion;

e. a fluidically braked piston.

2. The safety coupling according to claim 1, wherein the securing device is designed in such a way that, having a trigger mechanism in such a way that, the securing device automatically switches from the normal configuration mode into the emergency configuration mode when a predefined triggering condition occurs.

3. The safety coupling according to claim 2, wherein the triggering condition is one or more of the following conditions:

a. interruption of an electrical power supply to the safety coupling;

b. interruption of a compressed-air supply to the safety coupling;

c. interruption of a negative-pressure supply to the safety coupling;

d. exceeding of a threshold value of a leakage in an end effector connected to the safety coupling;

e. undershooting or exceeding of a threshold value of a negative pressure applied to the safety coupling;

f. receiving of an emergency signal by a receiving device of the safety coupling.

4. The safety coupling according to claim 2, wherein the securing device comprises an actuating element, which can be moved between a first switching position and a second switching position, the actuating element being designed in such a way that, in the normal configuration mode of the securing device, the actuating element is in the first switching position and, when the triggering condition occurs, the actuating element is automatically transferred into the second switching position.

5. The safety coupling according to claim 4, wherein the securing device comprises a fixing device, which can assume a locking configuration and a release configuration, wherein the fixing device fixes the manipulator coupling portion and the end effector coupling portion at a fixed distance from one another when the fixing device is in the locking configuration and this fixing is released when the fixing device is in the release configuration, and wherein the fixing device interacts with the actuating element in such a way that, by transfer of the actuating element from the first switching position into the second switching position, the fixing device can be transferred from the locking configuration into the release configuration.

6. The safety coupling according to claim 1, wherein the securing device fixes the manipulator coupling portion and the end effector coupling portion at a fixed distance from one another, mechanically, further with form closure, friction closure and/or force closure, magnetically and/or by means of negative pressure, when the securing device is in the normal configuration mode.

7. The safety coupling according to claim 1, wherein the securing device comprises an actuatable permanent magnet or an electromagnet, by means of which the manipulator coupling portion and the end effector coupling portion can be fixed at a fixed distance from one another.

8. A handling system comprising: the manipulator, the end effector, and the safety coupling according to claim 1, wherein the end effector is fastened to the manipulator by means of the safety coupling.

9. The safety coupling according to claim 1, wherein the damped spring is a coil spring and the fluidically braked piston is an air-braked piston.

* * * * *